G. L. MAYO 3,331,410

WOODWORKING MACHINE

Filed March 5, 1965

INVENTOR.
GEORGE L. MAYO

BY

*Fred N. Schwend*

ATTORNEY.

United States Patent Office 3,331,410
Patented July 18, 1967

3,331,410
WOODWORKING MACHINE
George L. Mayo, Fort Worth, Tex., assignor to Clary Corporation, San Gabriel, Calif., a corporation of California
Filed Mar. 5, 1965, Ser. No. 437,606
28 Claims. (Cl. 144—2)

ABSTRACT OF THE DISCLOSURE

A machine for automatically finishing wooden doors to receive locks, hinges, etc. wherein each door is advanced successively through certain stations and wherein cutters are located at each of the stations with means for moving the cutters to mortise or otherwise form the lock receiving holes and the lock and hinge recesses.

---

This invention relates to woodworking machines and has particular reference to automatic processing machines for processing doors, windows, or the like.

Doors are made in different sizes and the hardware associated therewith, such as hinges, bolts, door knobs, etc., are also made in different sizes and shapes. Also, the location of such hardware on the door varies in accordance with local customs or other requirements.

Heretofore, machines for automatically mortising, boring or otherwise processing wooden doors, windows, or the like, to receive various pieces of hardware, have generally been built to accommodate a certain size door only and, in many cases, to accommodate only certain sizes and shapes of hardware. This creates considerable hardship in cases where mills or processing plants receive orders for batches of doors of different sizes to receive hardware of different sizes and shapes.

It therefore becomes a principal object of the present invention to provide a processing machine for doors, or the like, which is quickly and easily adjustable to receive doors of different sizes.

Another object is to provide a processing machine for doors and the like, in which various cuts and recesses required for receiving hardware may be quickly varied in size, shape and location, as required.

Another object is to provide a door processing machine for quickly and automatically processing doors of different sizes and shapes.

The manner in which the above and other objects of the invention are accomplished will be readily understood on reference to the following specification when read in conjunction with the accompanying drawings, wherein.

Referring to the drawings and particularly to FIGS. 1 to 4, the frame of the machine comprises a plurality of upstanding pedestals 10 which support three spaced parallel frame members 11, 12 and 13 extending substantially the length of the machine. Spaced cross braces 14 are secured between the frame members 12 and 13 and each has secured thereto a gear rack 15.

A carriage, generally indicated at 16, is supported for movement along the braces 14 by rollers 22. The carriage extends substantially the length of the machine and is divided into two body sections 17 and 18 suitably attached together to form an integral unit. Pinion gears 23 mesh with the racks 15 for moving the carriage laterally relative to the machine. Such pinions are keyed on shafts 24 and 25 which are rotatably mounted in bearings carried by the carriage. The shafts extend the length of the carriage. The shaft 25 is rotatably driven by a motor 27 (FIG. 4) mounted on the carriage body section 18 and connected to the shaft 25 by a chain and sprocket unit 28 and a transmission unit 26. Suitable manually operable controls (not shown) are provided for the motor 27 to control the positioning of the carriage for different widths of doors as will become apparent later on.

Supported above the frame members 11 and 12 is a beam member 29 (FIG. 1) which extends the length of the machine and, in turn, supports a master control panel 30 and other controls.

A door loading and feeding station generally indicated by the dotted lines 32, is located to the left of the machine. The construction of this station is not disclosed in detail since it may comprise any conventional form and does not comprise part of the present invention. It should be noted, however, that this station is capable of successively feeding wooden door blanks, indicated by dotted lines 92 (FIGS. 3 and 4), to the machine in timed relation with the various operations of the latter.

Referring now to the boring and mortising station, generally indicated at 33 (FIGS. 1 to 4), a second carriage 34 is mounted on the aforementioned carriage 16. Carriage 34 comprises a pair of vertical side plates 37 (FIGS. 3, 11 and 11A) extending lengthwise of the machine. The support sections 37 each have secured to the inside surface thereof a pair of plastic guide blocks 38 movable lengthwise of the machine along a pair of parallel, spaced guide bars 40 rigidly mounted on the carriage 16.

Figures 2, 5:
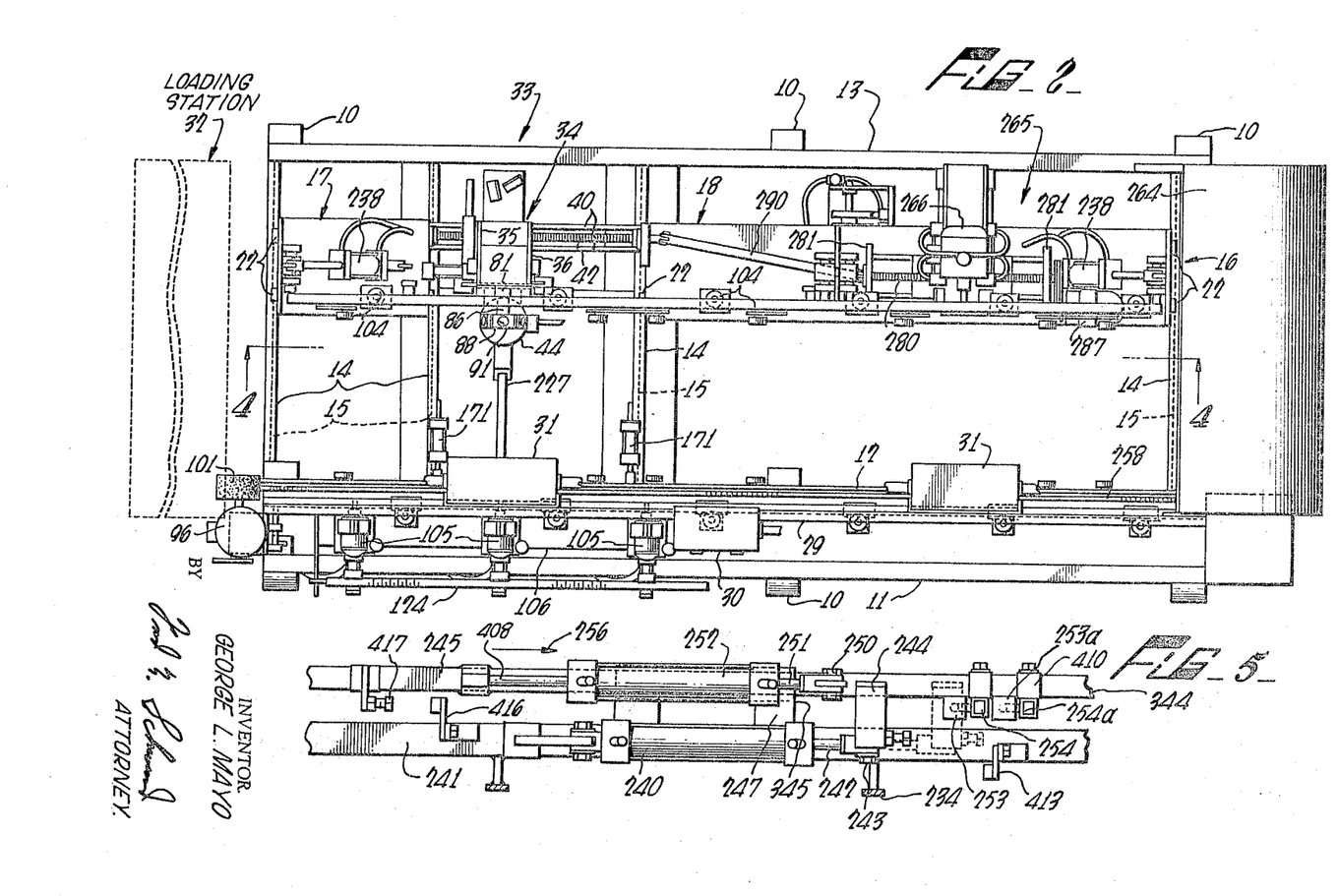
FIG. 2 is a plan view of the mortising machine.
FIG. 5 is a sectional plan view taken along the line 5—5 of FIG. 1 illustrating part of the door locating mechanism in ineffective condition.

Extending parallel to and between the plates 40 is a screw-threaded shaft 42 (FIG. 2). Shaft 42 is threaded into a suitable nut, not shown, carried by the carriage 34 for adjusting the position thereof along the length of the carriage 16, as will be described later. The side plates 37 are formed integral with a horizontal base plate 71 on which are slideable plastic bearing blocks 70 suitably secured to a pair of upright cross carriage side plates 35 and 36.

A router motor 43 and boring motor 44 are mounted on the carriage 34 for mortising a recess and boring a hole in each door blank to receive the door lock plate and door knob, respectively.

Motor 44 is secured to an inverted T-shaped metal base 45 (FIG. 12) slideable vertically within a pair of plastic bearing blocks 46 which are secured by bolts 48 to spaced support members 47. The members 47 are suitably secured to the side plates 35 and 36, the latter also supporting a pair of pneumatic cylinders 50. The cylinders extend vertically and the rods 51 of their pistons 51 are attached by bolts 52 to the base plate 45. Thus, upon application of air under pressure to the interiors of the cylinders 50 below the pistons (not shown), the boring motor, carrying a rotating boring head 90, is moved vertically to effect a boring operation. Upward movement of the boring motor is limited by a stationary stop shown by dotted lines 49 engageable by a stop member 59 mounted on the motor base 45.

Router motor 43, carrying a rotatable router head, has secured thereto a base 53 (FIG. 11) which is guided within a pair of spaced plastic bearing blocks 54 for movement in a horizontal direction transversely of the axis of the motor 43 and lengthwise of the machine.

Figures 9, 11, 11A:
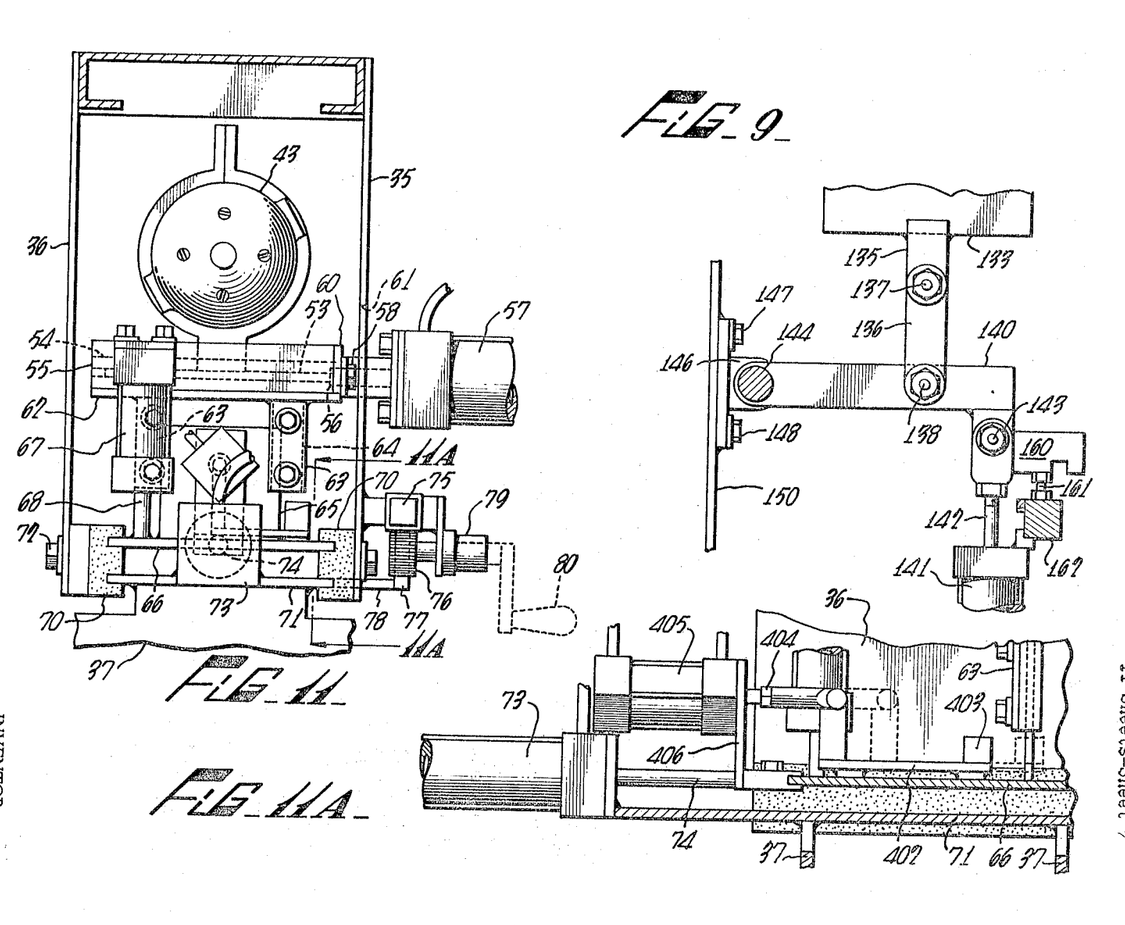
FIG. 9 is a transverse sectional view taken substantially along the line 9—9 of FIG. 7.
FIG. 11 is a view taken in the direction of the arrow 11 in FIG. 3 and illustrating the lock face plate router.
FIG. 11A is a sectional view taken along line 11A—11A of FIG. 11.

The base 53 is attached to the piston rod 56 of a pneumatic cylinder 57, a portion of which extends through an enlarged hole 61 in the side plate 35. Cylinder 57 has a projection including flange 60 which is secured by bolts 58 to a base 62 carrying the bearing blocks 54. The base 62 is supported by a pair of vertical supports 63 which have bolted thereto a pair of spaced plastic guide blocks 64. The latter are guided vertically by a bearing plate 65 which is mounted on a horizontal base plate 66 slideably supported by the bearing blocks 66.

The router motor 43 is raised and lowered by a pneumatic cylinder 67 which is suitably attached to the base 62 and has its piston rod 68 attached to the base plate 66.

A lower base plate 71 has a pneumatic cylinder 73 (see also FIG. 3) secured thereto. The piston rod 74 of the latter cylinder is secured to the plate 66 to effect axial movement of the router motor 43 against a suitable adjustable stop (not shown) to move its router head into and out of engagement with each door blank.

Means are provided to adjust the position of the boring motor 44 relative to the adjacent edge of the door. A rack 75 and meshing pinion gear 76 are located on the exterior of the plate 35 for manually adjusting the base 71 to different positions transversely of the machine. For this purpose, the rack 75 is secured to the side plate 35 of the cross carriage. The pinion 76 is mounted on a shaft supported by a bearing 79 which is mounted on a bracket 77 with an extension 78 of the base plate 71. The pinion is rotated by a handle, indicated by dotted lines 80, to move the cross carriage so as to set the boring motor 44 in different positions relative to the adjacent edge of the door blank.

Means are provided for locating the router motor 43 in a mid-position between its upper and lower limit locations so as to route a full recess for a lock plate even though a relatively small diameter router head is used. For this purpose, slide 402 (FIG. 11A) is suitably mounted for sliding movement over the plate 66 and carries a spacer or block 403 thereon. The slide is connected to the piston rod 404 of an air cylinder 405 which is supported from the piston rod 74 by a brace 406.

When the piston of cylinder 405 is actuated to the right, the block 403 will be positioned under the supports 63 for the router motor 43, thus limiting downward movement of the latter to a mid-position. Actuation of the piston of cylinder 405 to the left will remove the block 403 to its position shown in FIG. 11A, thus permitting the router motor to be moved to its lowermost position.

Means are provided for preventing fraying or splitting of the upper surface of a hole cut in a door blank by the boring bit 90 of the boring motor 44 as it breaks through such surface. For this purpose, a pneumatic cylinder 81 is mounted above the boring motor 44 and is attached to a horizontal cross piece 82 (FIG. 4) secured at its ends between the upright side plates 35 and 36 of the cross carriage. The piston rod 83 (FIGS. 3 and 4) of the cylinder 81 is secured to a plate 84 guided for vertical movement in spaced vertical plastic guide blocks 85 which are secured to the inside surfaces of the plates 35 and 36.

Figures 3, 3A:
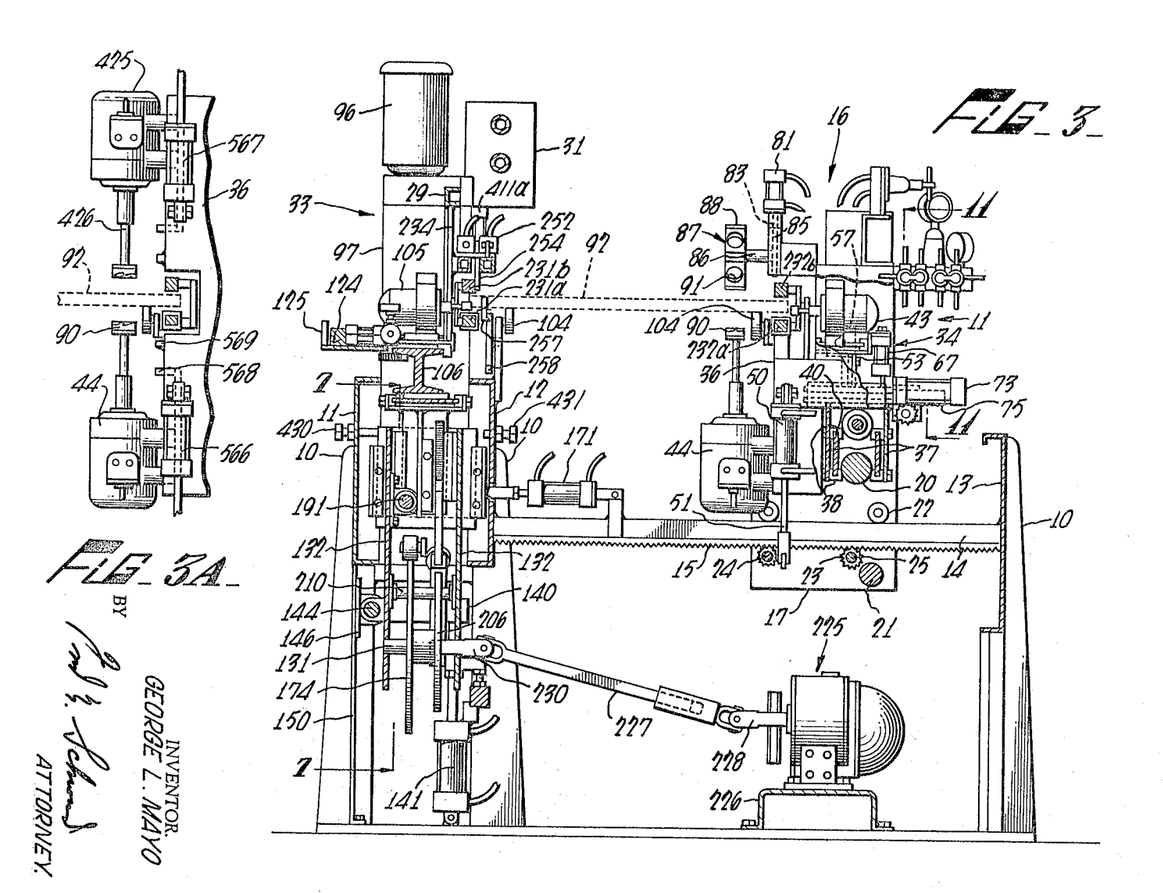
FIG. 3 is a transverse sectional view of the machine and is taken substantially along the line 3—3 of FIG. 1.
FIG. 3A is a fragmentary view similar to FIG. 3, illustrating a modified form of the invention.

A shaft 86 carried by the plate 84 rotatably supports a wheel member 87, having wooden blocks 88 forming the periphery thereof. As best seen in FIG. 3, these blocks are lined up with the boring head 90 and have recesses 91 formed therein which are of substantially the same diameter as that of the boring head 90. Suitable detenting means (not shown) hold the wheel in place with a selected block 88 extending horizontally over the door blank. During a boring operation of the motor 44, the cylinder 81 will yieldably hold the lowermost block 88 against the top surface of the door blank 92 located in mortising station 33. The holes 91 may be of different diameters in the different blocks so as to receive cutting heads of different diameters which may be mounted at different times on the motor 44. Thus, the wheel 87 may be rotated to present a block having a hole of appropriate diameter to the boring head.

Means are provided for advancing each door blank from the loading station 32 into the first mortising and boring station 33. For this purpose, a motor 96 (FIGS. 1 and 2) is carried by a plate 97 secured between the frame members 11 and 12. This motor drives a friction wheel 101 located over a guide wheel 102 which is mounted on a plate 103 carried by the vertical plate 97. Thus, as a door blank 92 is advanced to the right (FIG. 1) from the loading station 32, it passes between the wheels 101 and 102 whereby it is further advanced over a plurality of guide rollers 104 to approximately the position shown at the left of FIG. 4. Means to the described later accurately locate the door blanks longitudinally of the machine.

A set of three hinge plate recess routers 105 (FIGS. 1, 2, 3 and 13) are located at the station 33 for cutting recesses to receive respective hinge plates (not shown). Such motors are mounted on a common I-beam support 106.

The construction of the three hinge plate routers and their mountings is identical and therefore only one will be described in detail. Each router motor 105 (FIG. 13) carries a router or cutter head 105′ and is mounted on a base 107 which is guided for horizontal movement in a direction parallel to the axis of the motor by a pair of spaced plastic bearing blocks 108. The latter are carried by a support 112 which, in turn, has secured thereto a pair of plastic bearing blocks 113. The guide blocks 113 are slideably adjustable along the rail 106.

Figures 12, 13:
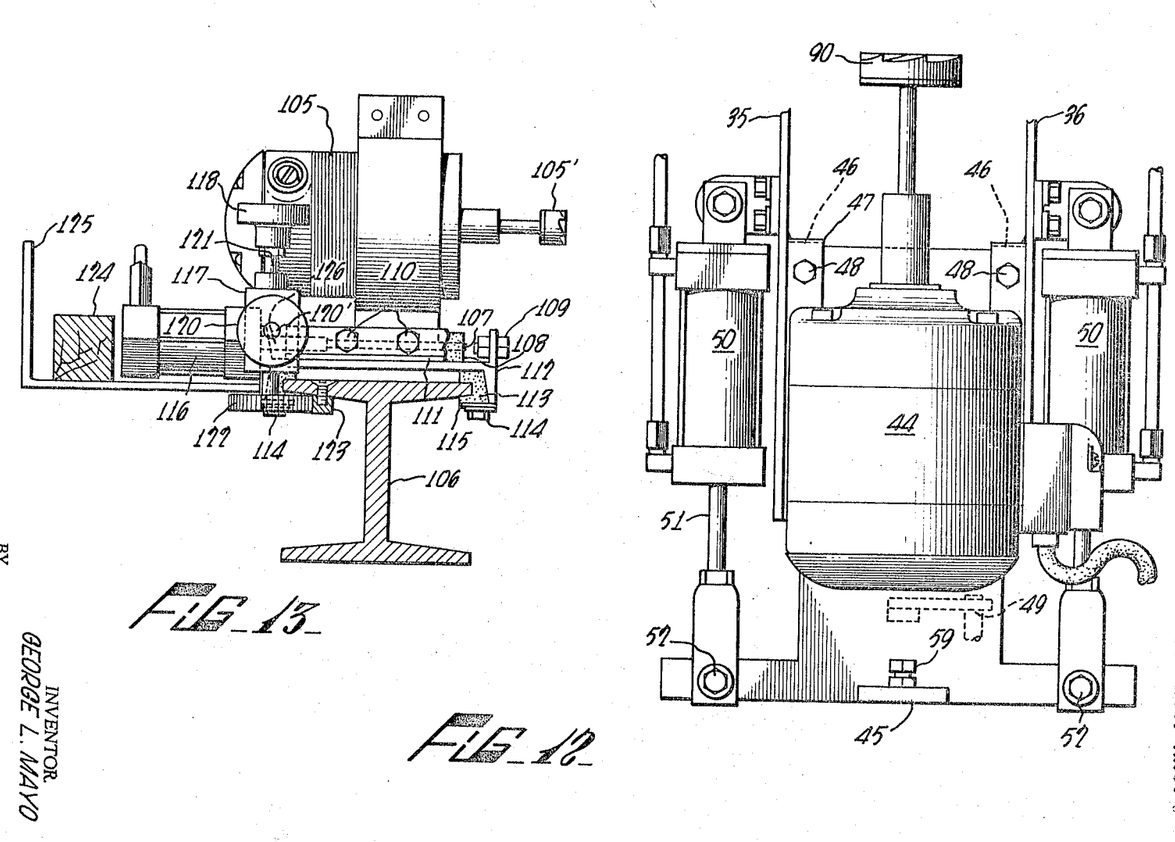
FIG. 12 is an enlarged front view of the boring device for cutting the door knob receiving hole in a door blank.
FIG. 13 is a transverse sectional view illustrating one of the router devices for mortising hinge plate receiving sections in a door blank.

Also secured to the support section 112 is a pneumatic cylinder 116 having its piston rod 126 secured to the motor base 107 whereby to effect axial movement of the motor to advance the head 105′ into and out of cutting engagement with a door blank. An adjustable stop 109 is mounted on the support section 112 to limit movement of the router toward the door blank to thereby control the depth of the hinge plate receiving recess.

For the purpose of adjusting the position of the router motor longitudinally of the machine, a gear rack 123 is secured to the rail 106 and is in mesh with a pinion 122 mounted on a shaft 121 journalled in a bearing 117 carried by the respective support 112. By rotating a knob 118 attached to the shaft 121, the router motor may be moved to different positions along the rail 106. A second knob 120 mounted on a lock screw 120' is threaded into the bearing 117 to clamp the shaft 121 in different adjusted positions.

It should be noted that all three router motors are advanced and retracted simultaneously into and out of cutting engagement with the door blank by means of the respective pneumatic cylinders 116.

Referring now in particular to FIGS. 3, 6, 7 and 8, means are provided for moving the router motor support rail 106 both vertically and longitudinally relative to the machine to properly route the hinge plate receiving recesses in a door blank. For this purpose, a cam unit 130, including a pair of cams 174 and 206, is provided, the cams being mounted on a shaft 131 rotatably supported between a pair of vertical support plates 132. The plates 132 are secured at their ends to a pair of U-shaped bearing plates 133 and 134, thus forming a box frame. The latter frame is guided for vertical movement, as will be described presently.

The lower ends of the plates 133 and 134 (FIGS. 8 and 9) each have an extension 135 which is pivotally connected at 137 to links 136 which, in turn, are pivotally connected at 138 to a lever 140. The levers 140 are secured to a rod 144 pivotally supported by bearings 146 which are secured by bolts 147 to vertical frame members 150 and 151 (see also FIG. 1). The other ends of the leevrs 140 are pivotally attached at 143 to the piston rods 142 of a pair of pneumatic cylinders 141 supported by the base of the machine whereby to raise and lower the cam unit 130.

Means are provided for locating the cam unit 130 in different pre-selected vertical positions in accordance with the amount of "revel" or distance $a$ (FIG. 10) between the lower surface of the door blank 92 and the parallel edge 300 of the recess to be routed out for the hinge plate. For this purpose, each of the levers 140 (FIG. 9) has an extension 160 adapted to rest against one of a series of adjustable stop elements 161 (see also FIGS. 1 and 7), two sets of which are provided for the two levers 140, respectively. The stop elements 161 are adjustably mounted on a support bar 162 which is suitably supported by the cylinders 141, and is adjustable lengthwise into different positions to locate different stop elements under the extensions 160.

The aforementioned bearing support plates 133 and 134 (FIGS. 6, 7 and 8) are guided vertically in spaced plastic guide blocks 166 supported by a pair of frame elements 170.

Suitable manually controlled means (not shown) are provided for applying air under pressure to the cylinders 141 to temporarily raise the cam unit 130 so as to permit adjustment of the bar 161 to position selected ones of the stop members 161 in blocking relation with the arms 140.

It should be noted that the lefthand edges of door blanks (as viewed in FIG. 3) are often cut at a slight angle to the vertical, i.e., 3°. Accordingly, means are provided to guide the routers 105 in paths parallel to such edges. For this purpose, the box frame, including plates 132, 133 and 134, is rockable about the pivots 138 between limits determined by adjustable stops 430 and 431 mounted on the frame members 11 and 12 to position the routers.

In order to adjust the above structure between a vertical position and an angled position, pneumatic cylinders 171 are provided. Such cylinders are mounted on braces 14 and have their piston rods 171' (FIG. 8) extending through openings 172 in the frame member 12 and attached to respective ones of the frames 170.

When door blanks with beveled edges are encountered, the cylinders 171 are actuated by selectively settable controls (not shown) to rock the router unit clockwise in FIG. 3 until arrested by stops 431.

Describing now the means for moving the router support rail 106 (FIGS. 3, 7 and 13) vertically and longitudinally of the machine under control of the cams 174 and 206, the cam 174 cooperates with a follower roller 175 mounted on a lever 176 which is pivotally supported on a shaft 177 extending between the cam unit frame plates 132. The lever 176 is pivoted at 185 to a block 184 in which is threadably secured the piston rod 181 of a pneumatic cylinder 182. The latter is pivotally supported at 183 to both of the support plates 132 and is effective to yieldably hold the roller 175 in engagement with the cam 174.

Also pivotally attached to the lever 176 by a pivotal connection including bolts 186 (see also FIGS. 6 and 7A), is a link 187 pivoted at 190 to an arm 188 slideably keyed to a torque shaft 191. The latter is pivotally supported on one of the plates 132 by bearings 192. Arms 194 (see also FIG. 8) attached to the shaft 191 are pivoted at 196 to rectilinear bearing blocks 199 slideably fitted in slots 199' formed in vertical plate members 195. The latter are guided for vertical movement by plastic guide blocks 197 which are suitably secured to the plate members 133 and 134.

The plate members 195 support, at their upper ends, horizontal plastic guide blocks 202 (FIG. 7) which slideably support a beam member 204 for horizontal movement. The latter member is rigidly secured to the lower edge of the router support rail 106 for supporting the latter. Accordingly, rocking of the cam follower lever 176 will cause a rocking of shaft 191 to raise and lower the rail 106 and routers carried thereby.

It should be noted that the bolts 186 extend through a slot 189 in the lever 176 permitting the link 187 to be adjusted along the length of the lever 176 to vary the angle of movement of the shaft 191 and hence the amount of vertical movement of the routers.

Figures 6, 8, 10:
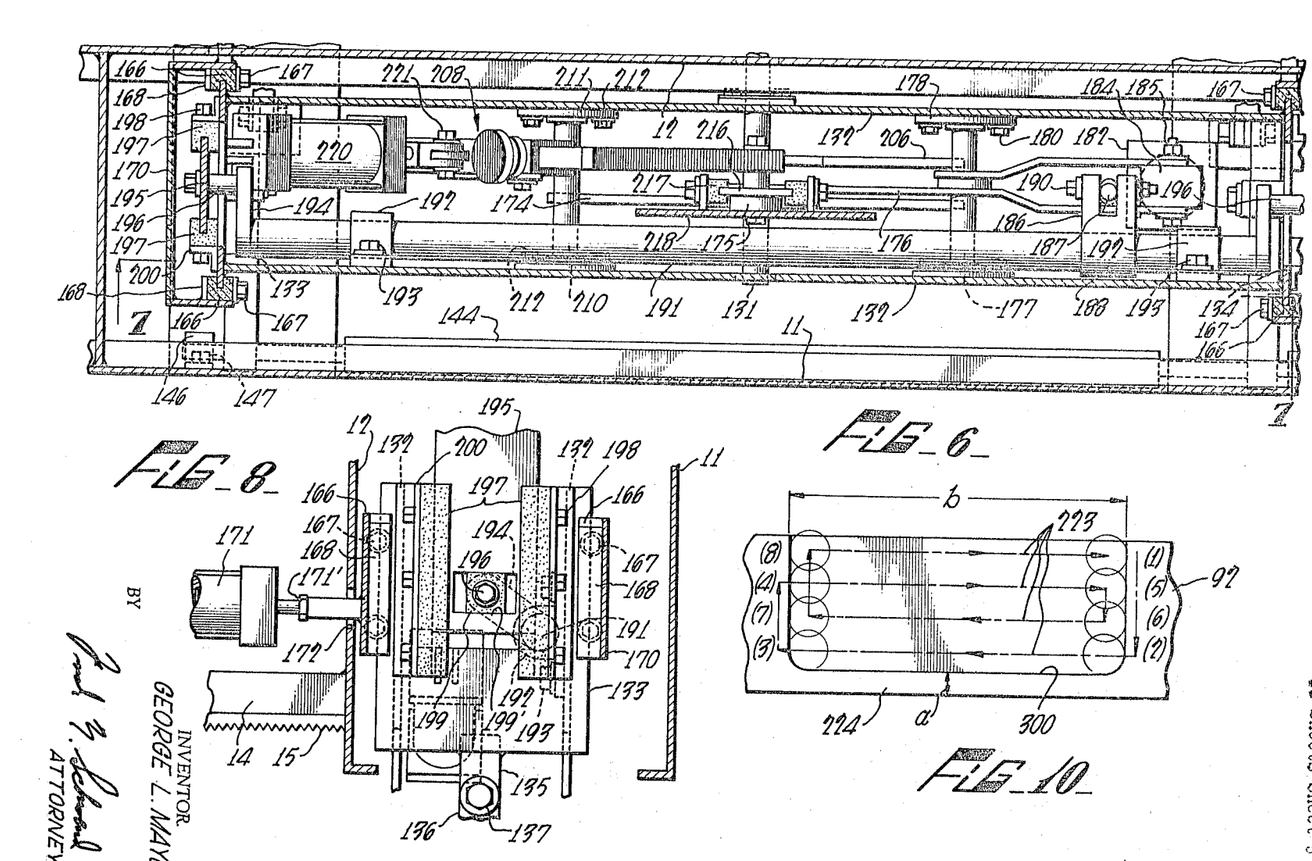
FIG. 6 is a sectional plan view taken substantially along the line 6—6 of FIG. 1 illustrating the router feeding mechanism.
FIG. 8 is a transverse sectional view taken substantially along the line 8—8 of FIG. 7.
FIG. 10 is a fragmentary end view of a door illustrating the path of one of the routers during the formation of a hinge plate receiving section.
Figure 7:
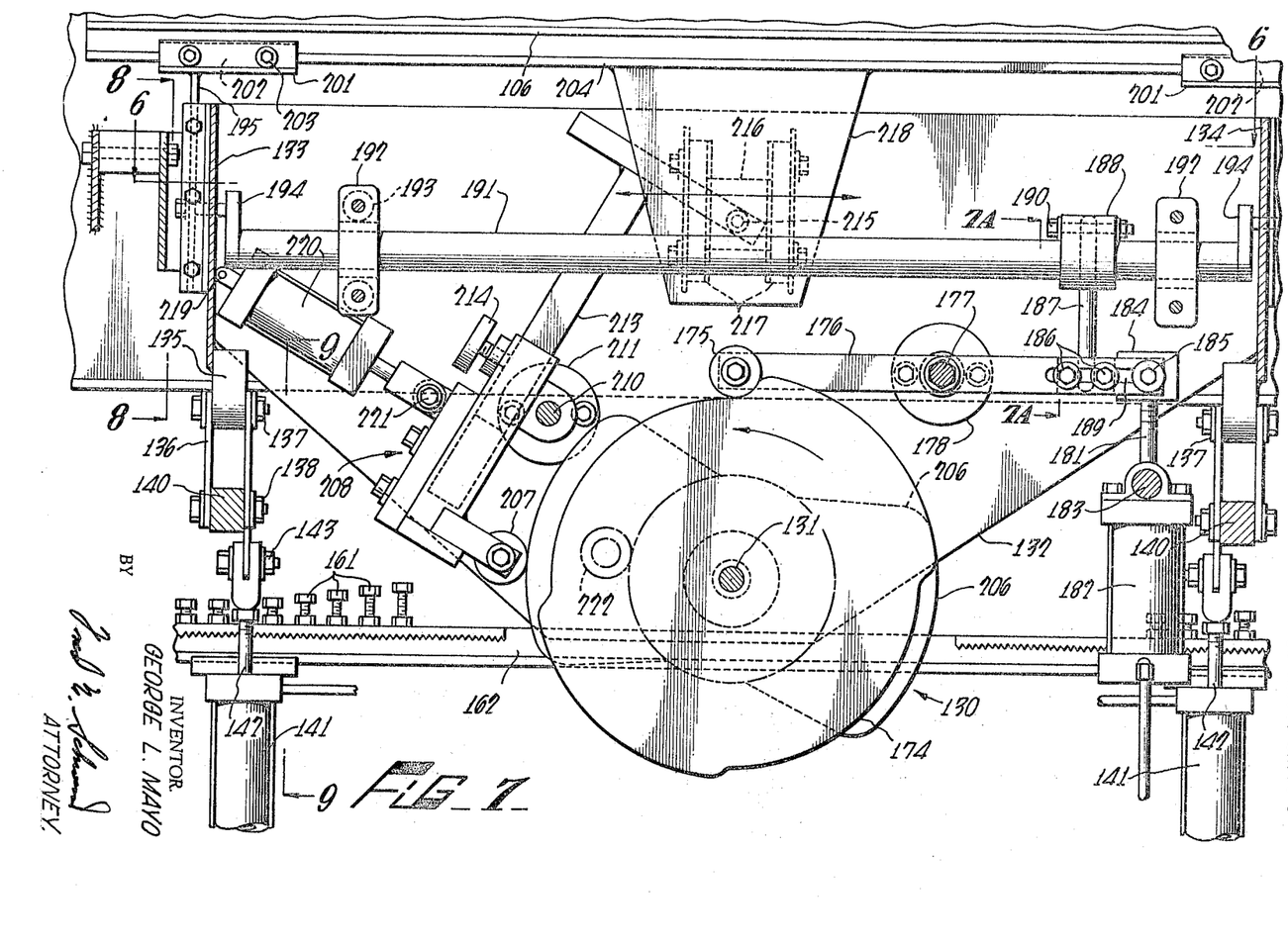
FIG. 7 is a sectional elevation view taken substantially along the line 7—7 of FIG. 6 illustrating the router feeding mechanism.

The cam 174 has four levers therearound as shown in FIG. 7, so that as it rotates, it becomes effective through the aforementioned linkage to vertically adjust the router motors to four different levels of horizontal movement depicted at 223 (FIG. 10).

Describing now the horizontal movement of the hinge plate recess routers by the cam 206, the latter cooperates with a cam follower roller 207 carried by a two-part lever 208. The latter is pivotally supported at 210 on the frame plates 132. The lower part of the lever 208 has a slide bearing therein which slideably receives an upper lever part 213 which is pivotally connected at 215 to a slide plate 216 slideably mounted for vertical movement in plastic guide blocks 217 attached to a depending projection 218 of the beam member 204.

A pneumatic cylinder 220 is pivotally supported at 219 to the end plate 133 and its piston rod is pivotally connected at 221 to the lever 208 to yieldably hold the roller 207 in engagement with the cam 206. Thus, as the cam 206 rotates, the cam follower lever 208 is rocked to shift the beam member 204, rail 106 and router motors longitudinally of the machine.

The shapes of the cams 174 and 206 are such as to cause the routers to follow the path shown in FIG. 10 during a complete revolution of the shaft 131, starting with the station marked (1) and progressing successively through stations (2) to (8) from whence the routers return to the initial station (1).

In order to change the lengths $b$ of the routed hinge receiving recesses to receive hinges of different lengths, the lever part 213 is adjusted to provide the requisite amount of movement to the router motors and is then clamped in place in the lower part of lever 208 by a clamp screw 214.

The shaft 131 carrying the cams 174 and 206 is driven through a complete revolution during each cycle of the machine by a motor and gear unit 225 (FIGS. 3 and 4), through a telescoping shaft assembly 227 and interconnected universal joints 228 and 230. The motor is supported on a pedestal 226 secured to the base of the machine.

The clamping means for clamping the door blanks in the two operating stations will now be described. As noted particularly in FIGS. 1 to 5, two pairs 231a, 231b and 232a, 232b of spaced longitudinally extending clamping bars are provided, the bars extending the length of the machine to clamp against the top and bottom surfaces of the door blanks 92. The rear bars 232a and 232b are supported by the carriage 16 and the forward bars 231a and 231b are supported by the stationary part of the machine, above the side frame member 12.

Figure 4:
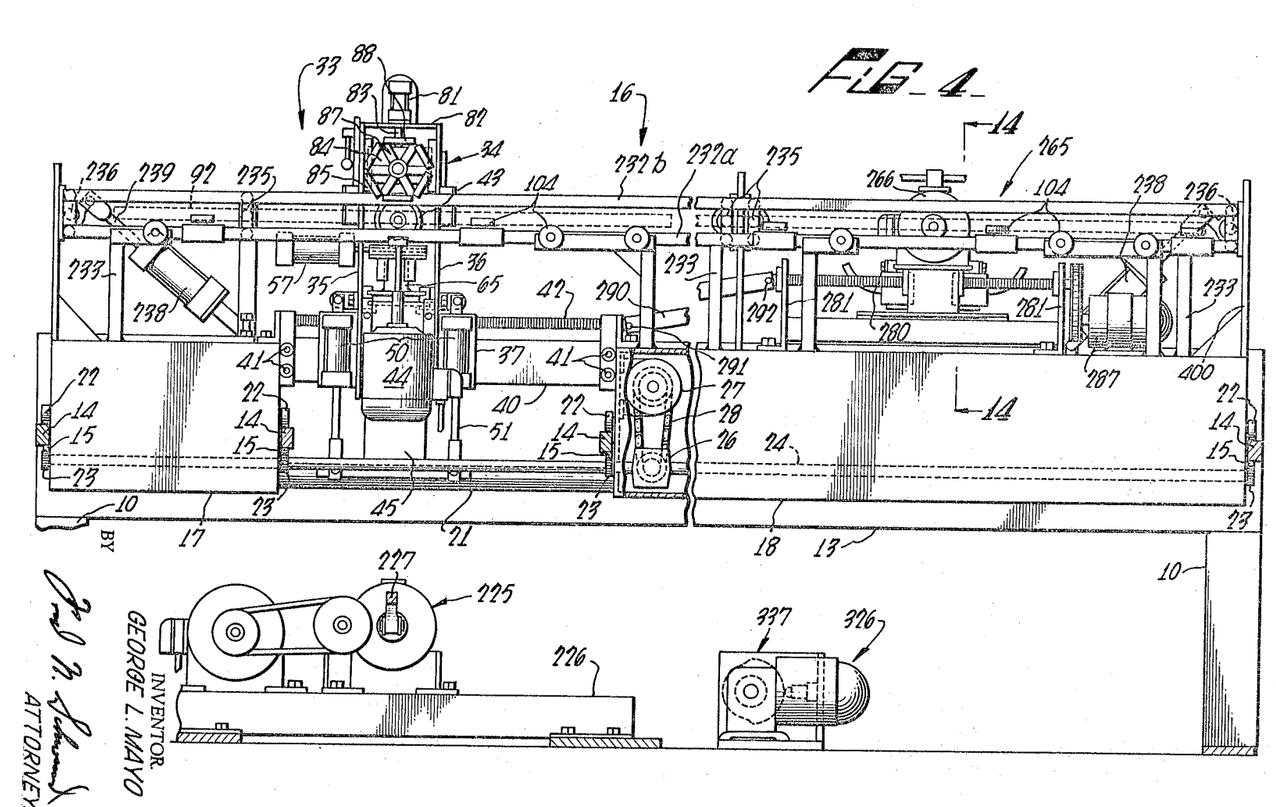
FIG. 4 is a sectional elevation view of the machine and is taken substantially along the line 4—4 of FIG. 2.

As best seen in FIG. 4, the rear clamping bars 232a and 232b are pivotally supported at their ends and at different points along their lengths by short levers 235 which are pivotally supported midway between their ends on shafts 236 journalled in suitable bearings mounted on stationary brace plates, i.e., 400. Certain of these levers have arms connected to the piston rods 239 of pneumatic cylinders 238 so that upon actuation of the cylinders the clamping bars are moved together to clamp a door blank or blanks 92 in position to be mortised and bored. Thus, the righthand edge of each door blank (as viewed in FIG. 3) is centered by the clamping bars 232 regardless of its thickness.

Figure 1:
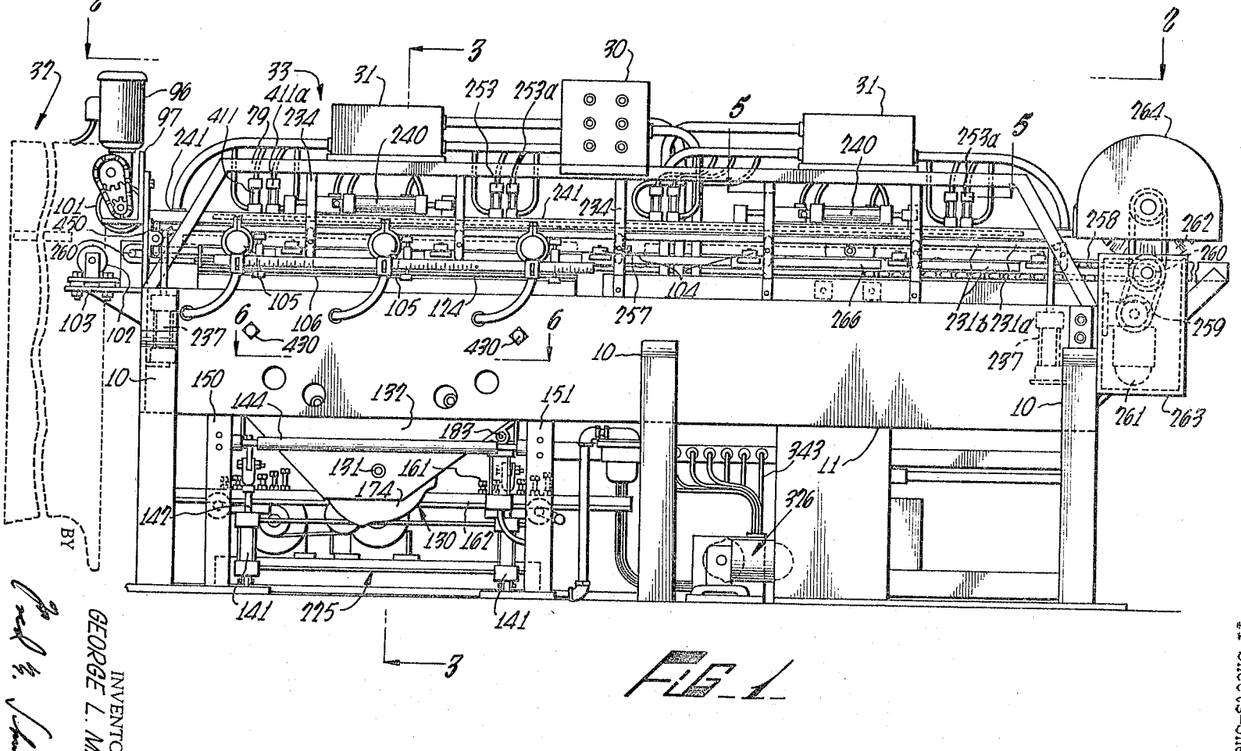
FIG. 1 is a side elevation view of a door mortising machine embodying a preferred form of the present invention.

The lower forward clamping bar 231a is fixedly mounted on frame supports, i.e., 234, whereas the upper clamping bar 231b is mounted for vertical clamping movement on levers 450 actuated by the pistons of pneumatic cylinders 237 (FIG. 1).

Means are provided for properly locating the door blanks in their mortising and boring stations just prior to the aforementioned clamping operations. This is accomplished by pairs of cylinders 240 and 252 (FIGS. 1, 5 and 17), there being one such pair at each station. Since the locating means associated with the two stations are similar, only one will be described in detail.

Cylinder 240 is fixed to a stationary support rail 241 and its piston rod 242 is connected by a bracket 244 to a bar 344 slideably supported for endwise movement in bearing sleeves, one of which is shown at 345, supported from the rail 241 by brackets, i.e. 247. Cylinder 252 is secured to the bar 344 and its piston rod 408 is attached to a second bar 245, also slideably supported for endwise movement relative to the bar 344.

The bar 344 carries a pair of air cylinders 253 and 253a spaced therealong, whose piston rods are attached to vertically movable locator dogs 254 and 254a, respectively, which are mounted for vertical sliding movement in bearings 410 adjustable along the rod. The rod 245 carries similar set of air cylinders 411 and 411a for vertically positioning locator dogs 412 and 412a, respectively.

Means are provided to accurately limit rightward movement of both bars 245 and 344 to likewise position the door blank in its station. For this purpose, the bar 344 is arranged to be blocked by a stop element 413 (see also FIG. 18) which is pivoted at 414 to a bracket 415 secured to the stationary rail 241. The stop member 413 may be swung from its blocking position shown in FIG. 17 relative to the bracket 244, to an alternate position shown by the dotted lines in FIG. 18 and full lines in FIG. 5 wherein it is ineffective to limit rightward movement of the bar 344.

A stop member 416, similar to member 413, is also pivotally supported by the rail 241 and when swung into a blocking position shown in FIG. 5 will be engaged by a projection 417 on the rail 245 so as to accurately limit rightward movement of the latter block.

In order to locate door blanks in proper positions at the two stations 33 and 265, they are first moved to approximate positions by an endless chain, partly shown at 258, FIGS. 1, 2 and 3. The latter extends the length of the machine and is supported at its ends by sprockets 260, one of which is driven by a motor 261 through a suitable transmission drive 259. The chain carrier spaced dogs 257 which engage the rear or left end edges of the door blanks (as viewed in FIG. 1) and move them rightward over the various guide rollers 104. The motor 261 is controlled to advance the door blanks and to locate them in positions slightly to the left of their final located positions.

Figure 17:
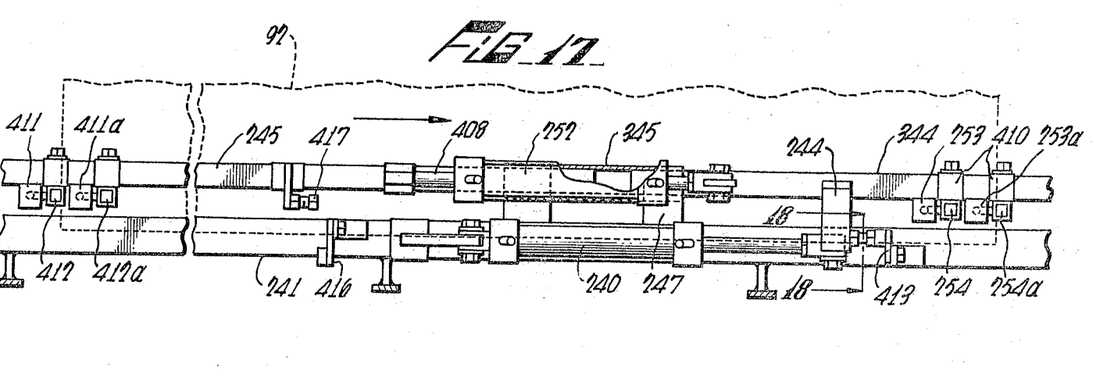
FIG. 17 is a view similar to FIG. 5 but showing the door locating mechanism in one locating condition.

It is important that the mortised and bored sections of the doors be accurately located relative to either the right or left edge of the door (as viewed in FIGS. 4 and 17), usually depending upon which edge is to be the upper edge of the finished door. If the critical measurement is to be made from the forward or righthand edge of the door blank, the stop member 413 is located in blocking position and the stop member 416 is located out of blocking position, as shown in FIG. 17. However, if the critical measurement is to be made from the lefthand edge of the door blank, the stop member 413 is located out of blocking position and the stop member 416 is located in blocking position.

Also, the cylinders 411 or 411a and 253 or 253a are chosen for operation, depending on the height of the door. For example, if a 7-foot door is to be handled, the cylinders 411 and 253a are connected through suitable valve means (not shown) to actuating mechanisms, to be described later, to set lower the locator dogs 412 and 254a into door engaging position, whereas if a 6-foot 8-inch door is to be handled, the cylinders 411a and 253 are connected to such actuating mechanism to lower their respective dogs. Other cylinders and cooperating dogs may be mounted on the bars 245 and 344 to locate doors of other lengths.

Now, the appropriate dog control cylinders, i.e., 411 and 253a, are actuated to lower the respective dogs into cooperative relation with the door blank located approximately in the corresponding station. This will occur when the bars 245 and 344 are held in their lefthand located positions shown in FIG. 5 wherein the dog 254a is spaced to the right from the righthand edge of the door blank and the dog 412 (FIG. 17) is likewise spaced to the left from the lefthand edge of the same door blank. Shortly after, the cylinder 252 is actuated, causing bar 245 to move to the right, thus clamping the door blank between the dogs 412 and 254a. During this time the cylinder 240 prevents leftward movement of the bar 344. If the stop members 413 and 416 have been located, as shown in FIG. 17, cylinder 240 will thereafter move bar 344 to the right, allowing bar 245 to follow so as to shift the door blank to the right. This movement will continue until the bracket 244 engages the stop member 413. Thus, the door blank will be accurately located with respect to its righthand edge. On the other hand, if the stop members 413 and 416 have been located in positions opposite those depicted in FIG. 17, the dog 412 will move the door blank to the right until stop 417 on the bar 245 is arrested by the stop member 416. Thus, the door blank will be accurately positioned in relation to its lefthand edge.

At the end of each mortising and boring operation, the dog controlling cylinders 411, etc., are actuated to raise the locator dogs above the level of the door blank and the cylinders 240 and 250 are then actuated to return the bars 245 and 344 to their lefthand positions shown in FIG. 5. At the start of a new operation the chain 258 will be actuated to advance the door blank previously at station 33 to the station 265 and to remove the door blank previously at station 265.

The second station 265 (FIGS. 2 and 4) will now be described. This station comprises a bolt hole boring device 266 shown enlarged in FIG. 14. The boring device 266, comprising a motor 266a and a boring head 266b, is secured to a base plate 267 which is guided for movement parallel to the axis of the motor by spaced plastic guide blocks 268 that are held by bolts 270 to a pair of support members 271 which are integral with a pair of support elements 272. The latter are secured to a main base frame 273 that supports a pair of pneumatic cylinders 274 located on opposite sides of the motor. The cylinders 274 are secured by bolts 275 to the elements 272 and their piston rods 276 are secured at 277 to an extension 278 of the base plate 267.

Figures 7A, 14, 15:
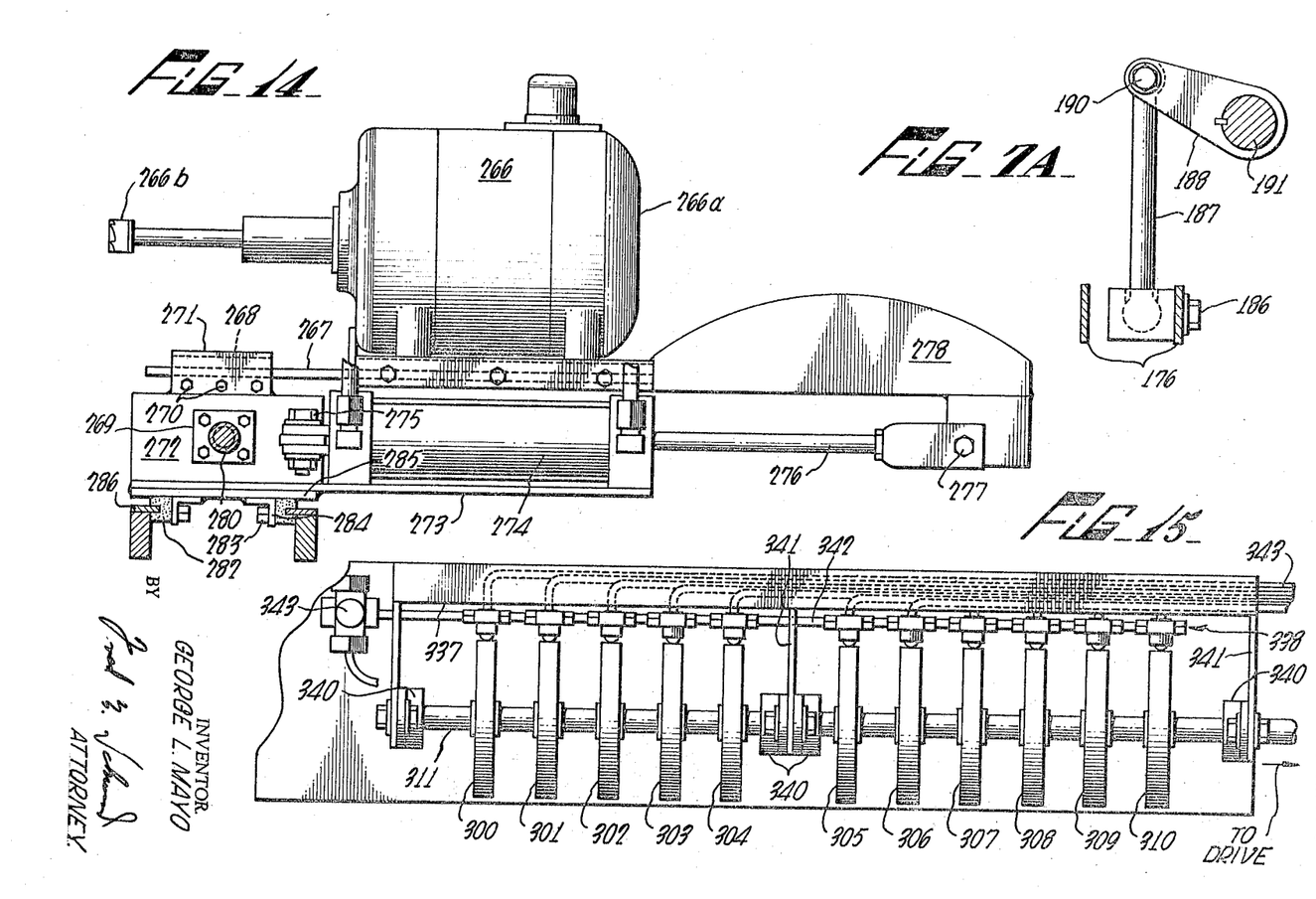
FIG. 14 is a transverse sectional view taken substantially along the line 14—14 of FIG. 4 and illustrating the bolt hole boring device.
FIG. 15 is a plan view of the cam unit for controlling the various pneumatic cylinder control valves.

A screw threaded rod 280 is threaded through a nut 269 mounted on one of the elements 272 and is rotatably supported at its opposite ends in bearings provided in the ends of a pair of upstanding plates 281.

A second pair of plastic bearing blocks 282 are suitably secured to the base frame 273. Blocks 282 are slideable over a pair of rails 286 suitably supported on the frame of the machine to permit lateral adjustment of the boring device 266 along the length of the machine.

Referring now to FIG. 4, a drive motor 287 is provided to rotate both the threaded rod 280 and the aforementioned threaded rod 42. The motor is mounted on the carriage section 16 and consequently travels therewith. The rods 42 and 280 are interconnected by an intermediate rod 290 through universal joints 291 and 292. It is to be understood that both of the threaded rods 42 and 280 have the same pitch and must turn simultaneously since the adjustment between the carriage 34 and the lock hole boring device 266 must occur together. That is, the complete lock component mortising and boring operations must be done at the same point on each door blank even though performed at the two different stations. However, by means of motor 287, the location of the lock bolt holes and recess relative to the top or bottom edge of the door may be readily changed as desired.

A rotary brush 262 is located adjacent the exit end of the machine and is driven by the motor 261, FIG. 1, through the drive transmission 259. The brush, which is housed largely within a cover 264, extends across the width of the machine to remove cuttings from the surface thereof.

*Operation*

Figures 16, 18:
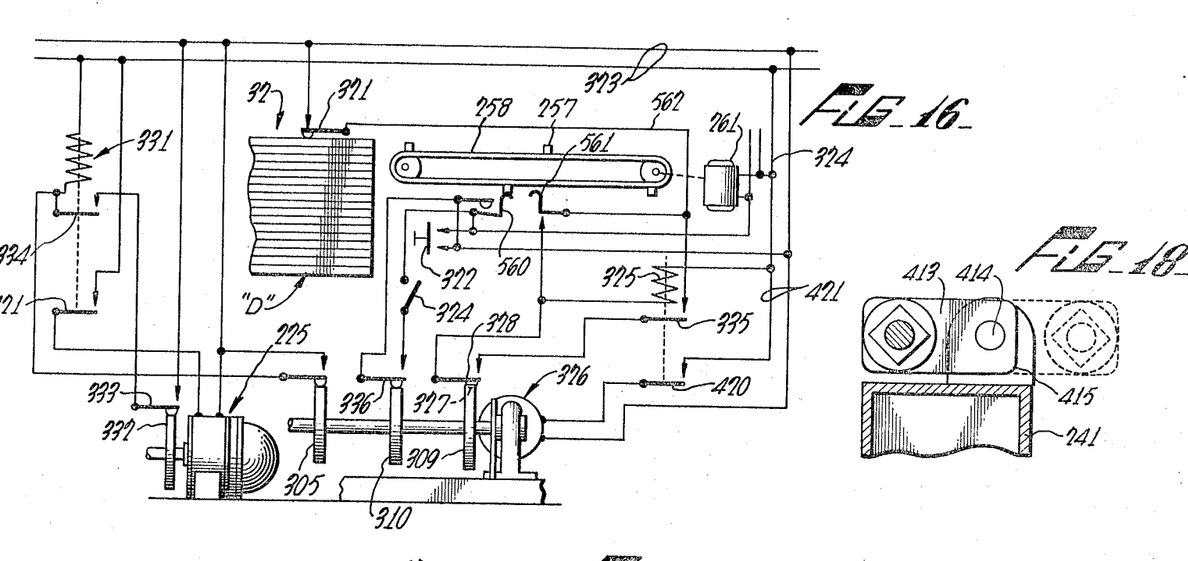
FIG. 16 is a schematic view illustrating certain of the electrical circuitry for controlling the machine.
FIG. 18 is a transverse sectional view taken along the line 18—18 of FIG. 17, showing the righthand location block in controlling position.

Describing now the general operation of the machine, the various operating units are under control of a master cam unit shown in FIGS. 15 and 16, the shaft 311 of which is driven by a motor 326. The cam unit is also effective to initiate a cycle of operation of cams 174 and 206, FIG. 7, driven by the motor 225, FIGS. 3 and 16.

Figure 19:
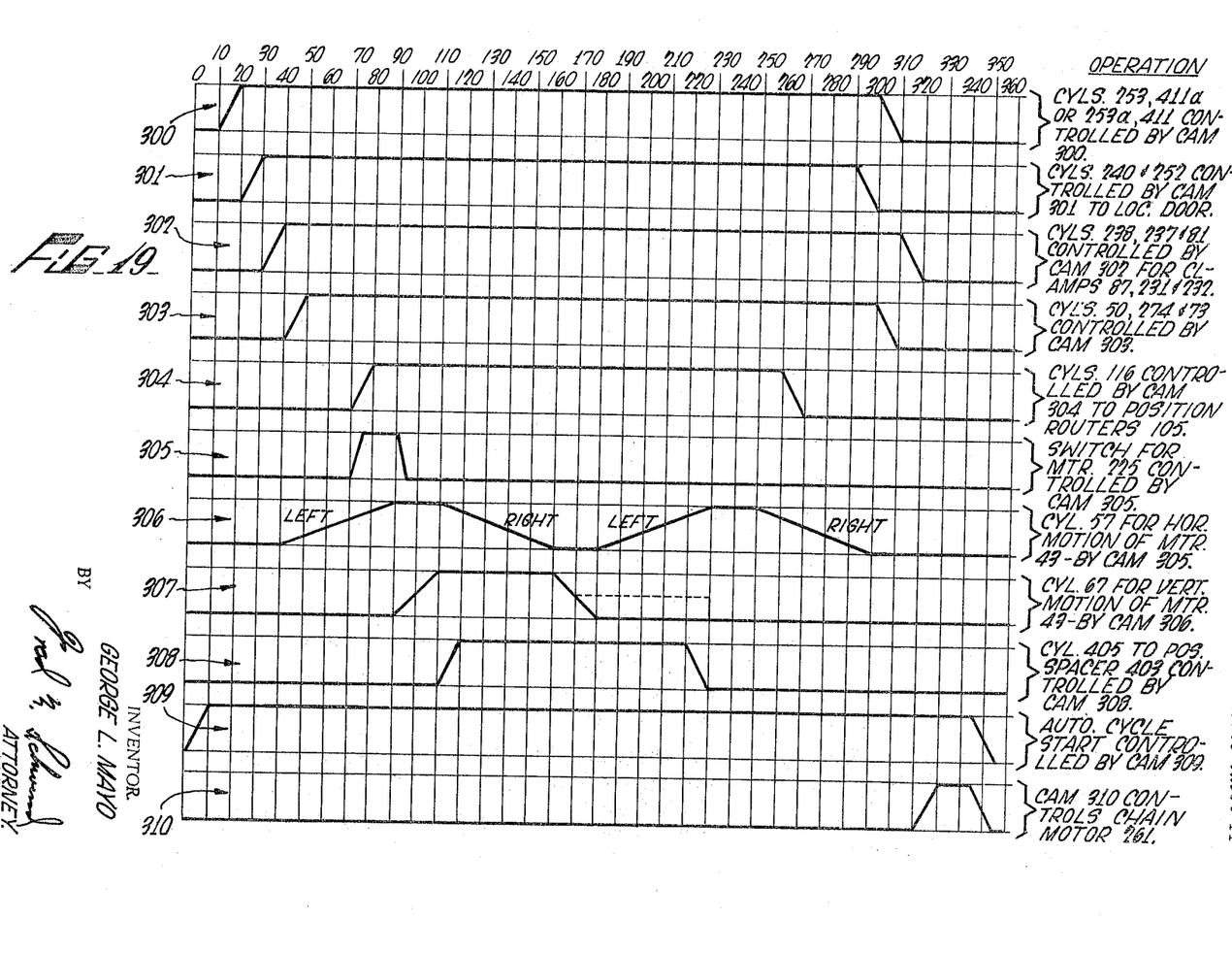
FIG. 19 is a timing chart illustrating the timing of different operating elements of the machine.

Referring in particular to FIGS. 16 and 19, the machine is capable of either complete automatic operation or a manually initiated operation in which a door is processed as an incident to each closing of a manually operable pushbutton switch 322.

The door loading station 32 (see also FIG. 1) contains provisions for supporting a stack D of door blanks, and such blanks are effective to maintain a switch 321 closed as long as one or more door blanks are in the loading station 32.

Presuming that one or more door blanks are in the loading station and the operator desires a single door to be processed, he sets a switch 324 in open condition and momentarily closes switch 322 to complete a circuit from the upper one of a pair of power supply lines 323, through line 324, switch 322 and motor 261, to the lower power supply line 323, causing operation of the motor 261 and suitable mechanism (not shown) within the loading station 32 to feed a door blank onto the chain 258 and to advance the chain to advance the new door blank to station 33 and to advance a door blank previously at station 33 to a station 265.

As the chain 258 advances, a dog 257 thereon recedes from a normally closed switch 560 connected across the switch 322, thereby permitting switch 560 to maintain the circuit of motor 261 energized.

As the door blanks approach their respective new stations, a succeeding dog 257 momentarily closes a normally open switch 561 to momentarily establish a circuit from the upper power supply line 323 through switch 321, line 562, switch 561 and coil of relay 325 to the lower power supply line. Relay contacts 335 and 420 now close, causing contacts 420 to establish a power circuit from the power supply lines 323 and lines 421 to the motor 326 to effect a cycle of operation of the various control cams (FIG. 15). Shortly after, the succeeding dog 257 opens switch 560 to stop the chain drive motor 261.

After the motor 326 has started, a holding circuit will be established through relay contacts 335, switch 327 controlled by a cam 309 on the cam shaft 311, and the coil of relay 325 to hold the relay energized until the cam unit on shaft 311 has completed a cycle, i.e. one revolution. At that time, the switch 327 will be allowed to break the holding circuit.

In the event it is desired to automatically process door blanks, one after the other, switch 324 is closed and the pushbutton switch is momentarily closed, as previously described, to initiate a cycle of operation of the chain drive motor 261. Just prior to completion of the door blank feeding operation the switch 561 will be closed by a succeeding feed dog 257 to initiate operation of the cam unit motor 326 as described hereinabove.

Toward the end of the cycle of motor 326, switch 336 is momentarily closed by cam 310 to complete a circuit through switch 325 and across the pushbutton switch 322, thus starting the motor 261 to again feed a new door blank to station 33.

The cam unit (FIG. 15) includes a bank of cams for controlling respective air valves 338. Air is supplied from a suitable source (not shown) through a master valve 343 and manifold 342 to each of the air valves 338. As the cams are rotated, they actuate respective valves at different times, causing air to be transmitted through respective tubes 343 to different ones of the pneumatic cylinders, causing their pistons to move in prescribed directions. Later, the cams allow the valves to return to their initial positions, causing the pistons to be actuated in opposite directions.

At 10 degrees, the cam 300 will actuate its respective valve to effect operation of selected ones of the cylinders 411 and 253a or 411a and 253, as typically shown in the upper graph of FIG. 19, to lower the associated door locating dogs in position over an aligned door blank. Shortly thereafter, at 20 degrees, the cam 301 actuates its valve to operate cylinders 240 and 252 to locate the door blanks at the two stations in proper positions. A slight delay in operating cylinder 240 is accomplished by restricting the orifice size for air admitted tot his cylinder. At 30 degrees, cam 302 will become effective to cause operation of the clamp bars 231b, 232a and 232b to clamp the door blanks in position for the mortising and boring operations. Cylinder 81 will also be operated at this time to lower the back-up wheel 87 (FIG. 4).

Subsequently, cam 303 will cause operation of cylinders 50 for the door knob boring device 44 and the cylinders 274 for the lock bolt boring device 266. Cam 303 also becomes effective to cause operation of the cylinder 73 to cause the lock plate mortising device 43 to move into cutting engagement with the door blank. Subsequently, cam 304 causes actuation of the cylinders 116 to move the hinge plate recess routers 105 into cutting engagement with the door blank.

At approximately 70 degrees, cam 305 momentarily closes a switch 330 (FIG. 16) to complete a circuit to the coil of a second relay 331 across the power supply lines 323. Relay contacts 421 establish a power circuit through the cam motor 225, causing the same to rotate the aforementioned cams 173 and 206 (FIG. 7).

As the motor 225 commences operation, a cam 332 driven thereby closes a switch 333 connected in circuit with relay contacts 334 and the coil of relay 331. Since relay contacts 334 are now closed, a holding circuit will be established through the coil of relay 331 to hold the same energized. At the end of one revolution of the cams 174 and 206, the cam 332 will allow the switch 33 to open to break the holding circuit and thus arrest the motor. This will occur prior to 260 degrees, at which time the cam 304 will cause retraction of the router motors 105 from the door blank.

At approximately 330 degrees, cam 310 on the cam unit shaft 311 closes switch 336 in the power circuit for the chain drive motor 261, causing the chain to advance the lefthand door blank to the right from the first station 33 to the second station 265 and to cause the door blank at station 265 to advance to the right from the second station to a receiving station (not shown).

FIG. 3A illustrates a modified form of the invention wherein the wooden wheel member 87, FIG. 3, is replaced by a second boring motor 425 having a boring head 426. The boring motor 425 is located in axial alignment with the similar motor 44 but is positioned above the upper side of the door blank 92. The motors 44 and 425 are slideably mounted for vertical movement on slide bearings (not shown) carried by the frame members, i.e. 36, forming part of the cross carriage.

Pneumatic cylinders 566 and 567, similar to cylinders 50, are provided to raise and lower both boring motors 44 and 425 under control of respective arms.

In this case, the motor 44 is first advanced upwardly until its boring head cuts through approximately one-half of the door blank and until a projection 568 on the slide thereof strikes a stop 569. Thereafter, it is withdrawn and during such withdrawal, the other motor 425 is advanced downwardly to bore through the remaining one-half of the door blank until it strikes a suitable stop and is thereafter withdrawn.

Although the invention has been described in detail and certain specific terms and languages have been used, it is to be understood that the present disclosure is illustrative rather than restrictive and that changes and modificaions may be made without departing from the spirit or scope of the invention as set forth in the claims appended hereto.

Having thus described the invention, what is desired to be secured by United States Letters Patent is:

1. In a woodworking machine,
    the combination of means for supporting a workpiece,
    a rotatable cutter for said workpiece,
    a first camming means for feeding said cutter vertically a predetermined distance relative to said workpiece,
    a second camming means for feeding said cutter horizontally a predetermined distance relative to said workpiece,
    a support for said last two mentioned means,
    means for guiding said support vertically, and
    selectively settable means for locating said support in any of a plurality of vertically different positions relative to said workpiece.

2. The combination according to claim 1 comprising means for pivoting said support for movement about a horizontal axis and means for selectively locating said support in any of a plurality of pivoted positions relative to said workpiece.

3. The combination according to claim 1 comprising means for changing said distance through which one of said camming means feeds said cutter.

4. The combination according to claim 1 comprising means for changing said distance through which said first camming means feeds said cutter and means for independently changing said distance through which said second camming means feeds said cutter.

5. In a woodworking machine,
    the combination of means for supporting a workpiece,
    a cutter for said workpiece,
    a first camming means for feeding said cutter vertically,
    a second camming means for feeding said cutter horizontally,
    a frame supporting said camming means,
    means guiding said frame for vertical movement,
    a support member, and
    a plurality of support elements on said member for supporting said frame in different vertical positions, respectively, relative to said workpiece, said member being selectively movable into different positions whereby to locate different ones of said supporting elements in supporting relation with said frame.

6. In a woodworking machine,
    the combination of means for supporting a workpiece,
    a rotatable cutter for said workpiece,
    a support,
    a first cam carried by said support,
    means including a first cam follower lever carried by said support and controlled by said first cam for moving said cutter vertically;
    a second cam carried by said support,
    means including a second cam follower lever carried by said support and controlled by said second cam for moving said cutter horizontally;
    means for locating said support in different positions relative to said workpiece,
    means for changing the lever arm of said first cam follower lever, and
    means for changing the lever arm of said second cam follower lever.

7. In a woodworking machine,
    the combination of means for supporting a workpiece,
    a plurality of spaced cutters for said workpiece,
    a member for supporting said cutters,
    means for adjusting the positions of said cutters relative to each other,
    a first camming means for advancing said member vertically relative to said workpiece,
    a second camming means for advancing said member horizontally relative to said workpiece,
    a support for said last two mentioned means, and
    means for selectively locating said support in a plurality of vertically different positions relative to said workpiece.

8. The combination according to claim 7 comprising means for moving said support laterally of the direction of horizontal feed of said member into any of a plurality of different positions.

9. In a woodworking machine,
    the combination of means for supporting a workpiece,
    a cutter for said workpiece,
    means comprising a carriage supporting said cutter for movement relative to said workpiece;
    a support for said carriage,
    means on said support for moving said carriage through a predetermined path, means comprising a plurality of stop elements for locating said support in different positions relative to said workpiece; and
    means for selectively setting different ones of said stop elements in cooperative relation with said support.

10. In a woodworking machine,
    a machine frame,
    means on said frame for supporting one edge of a door,
    a cutter device carried by said frame for mortising said door at said edge,
    a carriage on said frame,
    means on said carriage for supporting the opposite edge of said door,
    means for adusting said carriage toward and away from said first mentioned edge, and
    a second cutter device carried by said carriage for mortising said door at said opposite edge.

11. In a door processing machine,
    a machine frame,
    means on said frame for supporting one edge of a door,
    a carriage on said frame,
    means on said carriage for supporting the opposite edge of said door,
    means for edjusting said carriage toward and away from said first mentioned edge whereby to accommodate doors of different widths,
    means on said carriage forming a plurality of work stations, and
    means for sequentially advancing different ones of said doors to said work stations.

12. In a woodworking machine,
a machine frame,
means on said frame for supporting a first edge of a workpiece for movement successively into two separate operating stations,
a first carriage on said frame,
means on said carriage for supporting the opposite edge of said workpiece for movement successively into said two operating stations,
means for adjusting said carriage toward and away from said first edge whereby to accommodate workpieces of different widths,
a first cutting device at said first station,
a second cutting device at said second station, and
means for adjusting said cutting devices to operate at the same relative positions but at different locations on a said workpiece.

13. In a woodworking machine,
a machine frame,
means on said frame for supporting a first edge of a workpiece for movement successively into two separate mortising stations,
a first carriage on said frame,
means on said carriage for supporting the opposite edge of said workpiece for movement successively into said two mortising stations,
means for adjusting said carriage toward and away from said first edge whereby to accommodate workpieces of different widths,
a first cutting device at said first station,
a second carriage on said first carriage for supporting said first cutting device,
a second cutting device at said second station,
a third carriage on said first carriage for supporting said second cutting device, and
means for concurrently adjusting said second and third carriages into different positions relative to said first carriage.

14. In a woodworking machine having means for guiding a workpiece to a work station and means for operating on said workpiece at said station,
the combination of a locator engageable with a forward edge of said workpiece,
another locator engageable with a rear edge of said workpiece,
first means for urging said locators toward each other whereby to clamp said workpiece,
stop means for arresting one of said locators whereby to locate said workpiece at said station, and
second means operable after said first means for advancing said last mentioned locator into engagement with said stop means.

15. In a woodworking machine having means for guiding a workpiece to a work station and means for operating on said workpiece at said station,
the combination of a first locator engageable with a forward edge of said workpiece,
a second locator engageable with a rear edge of said workpiece,
first means for moving said devices toward each other whereby to clamp said workpiece,
a first stop means for arresting a first one of said locators whereby to locate said workpiece at said station,
a second stop means for arresting a second one of said locators whereby to locate said workpiece at said station,
means for selectively rendering either of said stop means effective and the other ineffective, and
a second means operable after said first means for advancing said locators whereby to engage said first locator with said first stop means or to engage said second locator with said second stop means.

16. In a woodworking machine having means for guiding a workpiece to a work station and means for operating on said workpiece at said station,
the combination of a first locating device engageable with a forward edge of said workpiece,
a second locating device engageable with a rear edge of said workpiece,
first means for urging said devices toward each other whereby to clamp said workpiece,
stop means for arresting said first device whereby to locate said workpiece at said station, and
second means operable after said first means for advancing said first locating device into engagement with said stop means.

17. In a woodworking machine having means for guiding a workpiece to a work station and means for operating on said workpiece at said station,
the combination of a first locating device engageable with a forward edge of said workpiece,
a second locating device engageable with a rear edge of said workpiece,
first yieldable means for moving said devices toward each other whereby to clamp said workpiece,
a first stop means for arresting said first device whereby to locate said workpiece at said station,
a second stop means for arresting said second device whereby to locate said workpiece at said station,
means for selectively rendering either of said stop means effective and the other ineffective, and
a second yieldable means operable after said first yieldable means for advancing said first locating device whereby to engage said first locating device with said first stop means or to engage said second locating device with said second stop means.

18. In a woodworking machine having means for guiding a workpiece to a work station and means for operating on said workpiece at said station,
the combination of a drive device for advancing said workpiece to approximately said station,
a first locating device engageable with a forward edge of said workpiece,
a second locating device engageable with a rear edge of said workpiece,
first means for moving said devices toward each other whereby to clamp said workpiece,
a stop means for arresting said first device whereby to accurately locate said workpiece at said station,
second means for advancing said first locating device into engagement with said stop means, and
means for rendering said first means effective and for thereafter concurrently rendering said second means effective.

19. In a woodworking machine having means for guiding a workpiece to a work station,
the combination of means for locating said workpiece at said station,
means for processing said workpiece at said station,
a first cyclically operable means for controlling said processing means,
a second cyclically operable means for causing operation of said locating means and for thereafter initiating operation of said first cyclically operable means,
said second cyclically operable means being operable after operation of said first cyclically operable means to cause said locating means to release said workpiece, and
means controlled by said second cyclically operable means to thereafter remove said workpiece from said station.

20. In a woodworking machine having means for guiding a door to a work station,
the combination of first means for locating said door at said station,
second means for clamping said door at said station,
third means for processing said door at said station, a first cyclically operable means for controlling said processing means, a second cyclically operable means for controlling said first and second means and said first cyclically operable means in succession, said second cyclically operable means being effective after operation of said first cyclically operable means to cause said first and second means to release said door, and means controlled by said second cyclically operable means to thereafter remove said door from said station.

21. In a door processing machine, the combination of means for guiding a door to an operating station, a cutting device at said station for cutting an edge of said door, and clamp means for clamping said door at said station, said clamp means comprising clamp elements engageable with opposite side surfaces of said door, means for moving said clamp elements equal amounts toward a center whereby to center said door relative to said cutting device, and means for thereafter causing said cutting device to cut said door.

22. The combination according to claim 21 wherein said moving means comprises a lever device and yieldable means for acuatting said lever device.

23. In a door processing machine, the combination of means forming a plurality of operating stations, means for guiding a door from one of said stations to the other, cutting devices at said stations for cutting an edge of said door to receive a lock, clamp means for clamping said door at said stations, said clamp means comprising clamp elements extending through both of said stations and engageable with opposite side surfaces of said door, and means for moving said clamp elements equal amounts toward a center whereby to center said door relative to said cutting devices at both of said stations.

24. In a door processing machine, the combination of means for guiding a door to an operating station, a rotary cutting device at said station for cutting a portion of said door to receive an attachment, and clamp means for clamping said door at said station, said clamp means comprising a pair of clamp elements engageable with opposite side surfaces of said door, levers pivotally connected at spaced points thereon to said clamp elements, means pivotally supporting said levers intermediate said spaced points for movement about axes lying in a plane coincident with the axis of rotation of said cutting device, and means for rocking at least one of said levers to move said clamp elements toward said plane whereby to center said door relative to said cutting device.

25. In a mortising machine, the combination of means for supporting a workpiece, a rotatable cutter for mortising said workpiece, a first camming means for camming said cutter vertically, a second camming means for camming said cutter horizontally, one of said camming means having dwell periods and active periods between said dwell periods, and the other of said camming means having dwell periods coincident with said first mentioned active periods and having active periods coincident with said first menitoned dwell periods.

26. In a mortising machine, the combination of means for supporting a workpiece, a rotatable cutter for mortising said workpiece, a support, means on said support supporting said cutter for horizontal movement, means on said support supporting said cutter for vertical movement, a first camming means on said support for camming said cutter vertically, a second camming means on said said support for camming said cutter horizontally, and means for driving both said camming means concurrently, said first camming means having a plurality of dwell periods and active periods between said dwell periods, and the other of said camming means having dwell periods coincident with said first mentioned active periods and having active periods coincident with said first mentioned dwell periods.

27. The combination to claim 26 comprising means for changing the extent of movement of said cutter by one of said camming means.

28. In a door processing machine, the combination of means for supporting a door, a pair of axially aligned boring devices located on opposite sides of said door, means supporting said devices for axial movement, means for advancing a first one of said devices to bore partially through said door and for thereafter retracting said first device, and means for advancing the second one of said devices to bore through the remainder of said door during retraction of said first device and for thereafter retracting said second device.

References Cited

UNITED STATES PATENTS

| | | | |
|---|---|---|---|
| 1,973,204 | 9/1934 | Goss et al. | 144—110 |
| 2,633,040 | 3/1953 | Schlage | 47—62 |
| 2,656,862 | 10/1953 | Gellert et al. | 144—2 |
| 3,238,980 | 3/1966 | Goldstein | 144—2 |

WILLIAM W. DYER, JR., *Primary Examiner.*

W. D. BRAY, *Assistant Examiner.*